May 27, 1930.   G. W. ELSEY   1,759,894
SHOCK ABSORBER
Filed March 3, 1927

Inventor
George W. Elsey
By Spencer, Hardman and Fehr
his Attorneys

Patented May 27, 1930

1,759,894

UNITED STATES PATENT OFFICE

GEORGE W. ELSEY, OF DAYTON, OHIO, ASSIGNOR, BY MESNE ASSIGNMENTS, TO DELCO PRODUCTS CORPORATION, OF DAYTON, OHIO, A CORPORATION OF DELAWARE

SHOCK ABSORBER

Application filed March 3, 1927. Serial No. 172,476.

This invention relates to improvements in rebound checks particularly adapted for use on automotive and other vehicles which have a frame or body supported by springs upon the road wheel axles.

It is among the objects of the present invention to provide a smooth operating rebound check of simple structure and design, which will permit vehicle springs to function as shock absorber elements when the road bed upon which the vehicle is operated is comparatively smooth, said rebound check, however, controlling the action of the vehicle springs when it is being operated over a substantially rougher road bed.

Further objects and advantages of the present invention will be apparent from the following description, reference being had to the accompanying drawings wherein a preferred embodiment of one form of the present invention is clearly shown.

Figure 1:
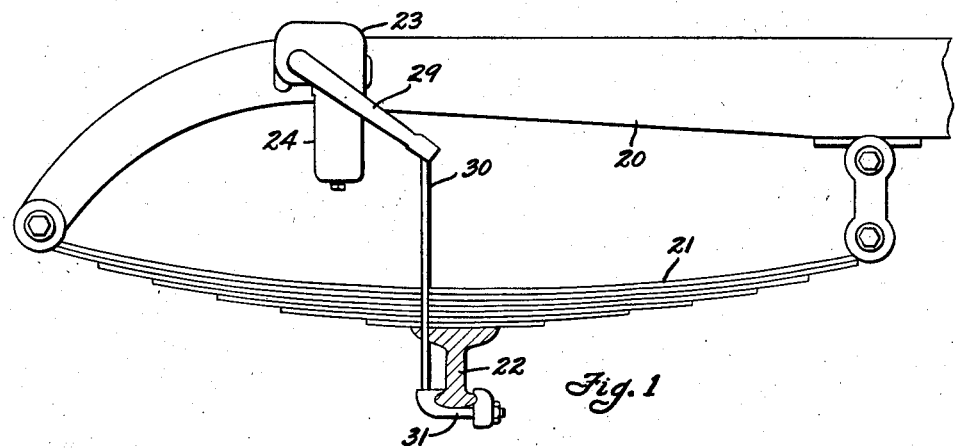
Fig. 1 is a diagrammatic fragmentary side view showing the vehicle frame and axle and a form of the present invention applied thereto.

Referring to the drawings, and more particularly to Fig. 1 thereof, the numeral 20 designates the frame member of the vehicle which is supported by springs, one of which is shown at 21, mounted upon an axle 22 to which the road wheels, (not shown) are secured. The rebound check includes a bracketed casing 23 providing a fluid reservoir to which is attached one end of the cylinder or pressure chamber 24 so as to communicate with said reservoir, the other end of the cylinder being closed as at 25. The bracketed casing 23 is attached in any suitable manner either to the axle 22 or to the frame 20, the present drawings illustrating said casing as secured to the frame. Within the casing 23 there is housed an oscillatable lever arm 26 secured by means of a screw 27 to a shaft 28, one end of which extends outside of the casing. The outside end of said shaft 28 has a lever arm 29 secured thereto, the free end of said lever arm being connected to one end of a cable 30, the other end of which is anchored to the axle 22 by means of the clamping member 31.

A piston 35 is reciprocally supported in the cylinder 24. This piston is of the cup-shaped type, the head portion being positioned in the cylinder adjacent the casing or reservoir 23. An aperture 36 is provided in the piston head, coaxial with the wall forming the skirt of the piston. In this aperture there is secured a tubular member 38 which extends into the space within the skirt portion of the piston and provides the passage 39. A head portion 40 is formed on the tubular member 38, said head portion resting on the piston head and providing a wear piece which is engaged by the oscillatable arm 26.

A passage 41 is provided in the piston head aside the aperture 36, forming communication between the fluid filled reservoir 23 and the interior of the cylinder. A check valve is provided at this passage 41 normally closing said passage. This check valve comprises a cup-shaped valve seat member 42 resting against the inside surface of the piston head, said valve seat member being in the form of an annulus. The valve 43, also in the form of an annulus and slidably supported on the tubular member 38, is held in engagement with the valve seat member 42 by means of a spring 44, the one end of which rests against the cup-shaped member 45 supported by the end of the valve seat sleeve 46, which screw threadedly engages the end of the tubular member 38 and extends coaxially into the cylinder 24. A cross passage 47 formed in the tubular member 38, provides communication between the passages 39 and 41, thereby connecting the reservoir with the inside of the cylinder 24.

Figure 2:
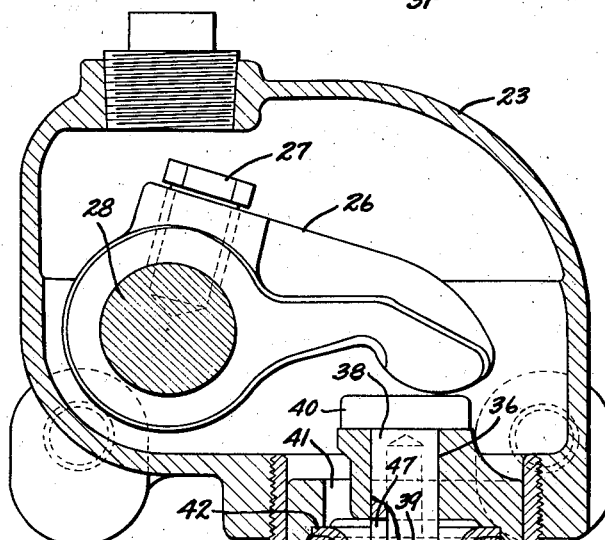
Fig. 2 is a longitudinal sectional view of the rebound check.
Figure 4:
Fig. 4 is a section taken along the line 4—4 of Fig. 2, one of the elements being omitted for the sake of clearness.
Figure 5:
Fig. 5 is a section taken along the line 5—5 of Fig. 2.

The sleeve 46 has two passages of different diameters, thus forming a ledge 48 which provides a valve seat in said sleeve. In the smaller diameter passage of the sleeve, the stem portion 49 of a relief valve 50 is slidably supported, while the head portion 51 of the valve rests upon the valve seat 48. As shown in the Fig. 5, the contour of the smaller diameter passage of the sleeve is round while the contour of the valve stem 50 is square; thus four passages 53 are provided between the valve stem and the sleeve which slidably supports it. These passages 53 terminate, however, beneath the head portion 51 of the valve, so that when the valve is on its seat as shown in Fig. 2, communication between cylinder and the larger diameter portion of the sleeve by way of passages 53 is cut off. A spring 54 is interposed between the valve and the tubular member 38, said spring exerting a substantial pressure upon the valve to hold it in engagement with its seat. A longitudinal passage 55 is formed in the valve 50 thereby providing a fluid flow path in parallel relation with the passage 53. The passage 55 is coaxial with the cylinder and has extending into and through it a metering pin 56, secured to the end 25 of the cylinder, by means of a screw plug 57. This screw plug comprises a recessed shank portion 58 provided with screw threads on the outside surface whereby said plug may be screwed into an aperture formed in the end of the cylinder. Stem 56 has a head 59 which fits into the apertured shank 58, the stem having a bushing 60 surrounding it, said bushing fitting snugly into the recess of the shank portion and resting upon the head 59. The edge 61 of the shank is spun over and against the end of the bushing 60 as well as against the stem 56, thereby securely fastening said stem in the shank portion of the plug 57.

The piston is operated in one direction in the cylinder by means of the oscillatable arm 26, and is operated in the opposite direction by means of the coil spring 65 interposed between the piston head and the cylinder end. The end of this spring engages with the valve seat member 42, thereby holding it in position on the inside surface of the piston head The operation of the device is as follows:

When the road wheels of the vehicle strike a substantial bump, the spring 21 will be flexed toward the frame 20, thus releasing the pull of spring 21 on the lever arm 29. This permits the spring 65 in the cylinder to move the piston toward the reservoir 23, thereby rotating the arm 26 in a counter-clockwise direction as regards the Fig. 2. This movement of the piston will compress the fluid in the reservoir 23, said fluid pressure moving valve member 43 from the valve seat 42 and thus establishing substantially a free flow of fluid from the casing or reservoir to the cylinder. The spring 21 tends to return the frame 20 and the axle 22 to their normal relative positions, thereby exerting a pull on the lever 29, and rotating it clockwise, resulting in a similar movement of the lever 26 in the reservoir, whereby said lever will push the piston back into the cylinder. In order to cushion this movement, the valve structure, included in the piston, is so constructed and arranged that it will return the fluid in the piston to the reservoir at a retarded rate. As soon as the piston is moved downward against the effect of spring 65, the fluid in the cylinder will be compressed; thus valve 43 will be closed tightly. As long as the pressure on the fluid in the cylinder remains beneath a predetermined value, the fluid will flow from said cylinder through the passages 55, 39 and 41 back to the reservoir. This restricts to a substantial degree the sudden return of the body and axle to normal relative positions by the spring 21. However, if the pressure in the cylinder exceeds a predetermined value, the valve 50 will be raised from its seat 48, against the effect of the spring 54 and thus will be established, in addition to the fluid flow through passage 55, a parallel fluid flow through passages 53, relieving the excess pressure on the fluid in the cylinder and thereby assuring the smooth cushioning action of the shock absorber.

For slight deflections of spring 21 due to very small bumps in the road bed, the action of the piston will be substantially unresisted due to the free flow of fluid past the valve 43 in one direction, and the comparatively unrestricted flow through the passage 55 in the other direction.

To vary the capacity of passage 55, applicant has provided means for inserting metering pins of various diameters. If one pin is found to be too large, that is if the size of the pin restricts aperture 55 to too great an extent, the plug supporting this metering pin is screwed from the cylinder and another plug supporting the proper size pin supplied in its place.

Figure 3:
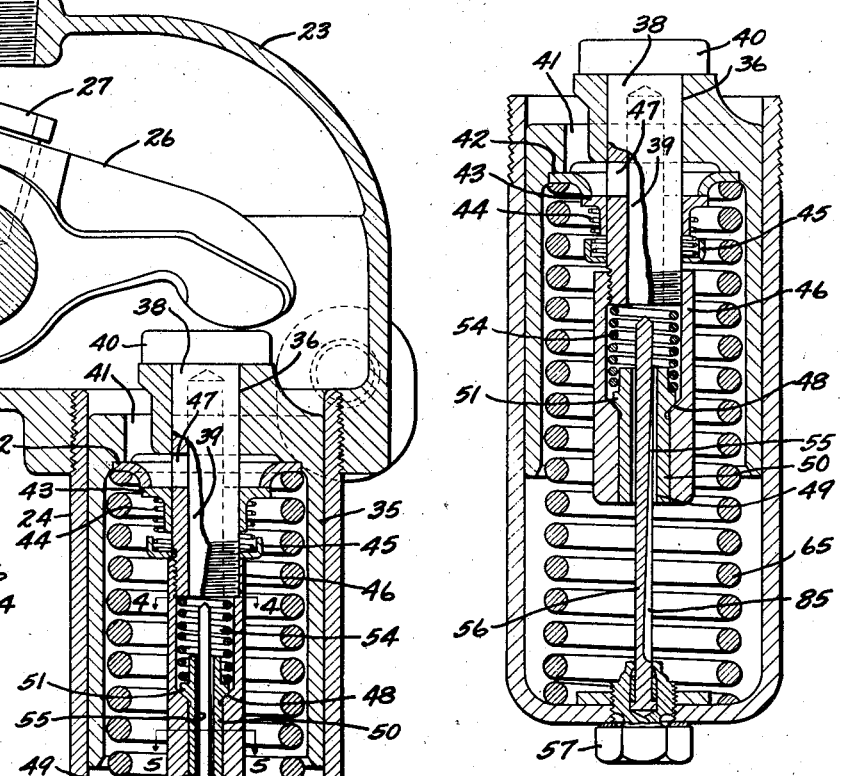
Fig. 3 is a view similar to Fig. 2 showing a modified form of the invention.

In the Fig. 3 the metering pin 56 is provided with a groove 85, which commences at the edge of the plug 57 and which extends substantially to the end of the pin, the cross sectional area of said groove gradually diminishing as it approaches the free end of the metering pin. By the use of a pin of this kind, the capacity of the passage 55 will be gradually increased as the piston in its downward travel, in which the oil is compressed, moves said passage toward the portion of the groove having an increased cross sectional area.

The present structure is so constructed and arranged that for very slight movements of the spring 21 no retarding action is offered by the rebound check or shock absorber, the spring 21 cushioning the vehicle at such times, however, when a substantial jolt is applied to the road wheels, said shock absorber will function to cushion the rebound, the cushioning effect being varied automatically in accordance with the impact on the wheels.

While the form of embodiment of the present invention as herein disclosed, constitutes a preferred form, it is to be understood that other forms might be adopted, all coming within the scope of the claims which follow.

What is claimed is as follows:

1. A shock absorber comprising in combination, a casing providing a fluid reservoir; a closed end cylinder attached to and communicating with said casing; a piston reciprocal in said cylinder; means supported by the piston for establishing substantially a free flow of fluid from the casing to the cylinder in response to the movement of the piston in one direction; and means for returning the fluid from the cylinder to the casing, at a retarded rate, in response to the movement of the piston in the other direction, said means comprising a valve carried by the piston and providing parallel passages one of which is effective as a fluid conductor, at such a time only when the pressure upon the fluid in the cylinder exceeds a predetermined value.

2. A shock absorber comprising in combination, a casing providing a fluid reservoir; a closed end cylinder attached to and communicating with said casing; a piston reciprocal in said cylinder; means supported by the piston for establishing substantially a free flow of fluid from the casing to the cylinder in response to the movement of the piston in one direction; and means for returning the fluid from the cylinder to the casing, at a retarded rate, in response to the movement of the piston in the other direction, said means comprising a duct provided by the piston, in which a valve is carried, orificed to provide a fluid passage when said valve is closed, the valve being adapted to open and provide a fluid passage parallel to the orifice when the pressure upon the fluid in the cylinder exceeds a predetemined value.

3. A shock absorber comprising in combination, a casing providing a fluid reservoir; a closed end cylinder attached to and communicating with said casing; a piston reciprocal in said cylinder; means supported by the piston for establishing substantially a free flow of fluid from the casing to the cylinder in response to the movement of the piston in one direction; and means for returning the fluid from the cylinder to the casing, at a retarded rate, in response to the movement of the piston in the other direction, said means comprising a tube carried by the piston and communicating with the casing, and having a sleeve secured thereto and extending into the cylinder, a valve seat provided in said sleeve and a valve held upon said seat by a spring, said valve having an aperture providing sole communication between the cylinder and the casing when the pressure upon the fluid in the cylinder remains below a predetermined value, the valve being lifted from its seat and providing an additional, parallel fluid passage when said pressure exceeds the pressure of the valve spring, and a metering pin removably secured to the end of the cylinder and extending coaxially into and through the aperture in the valve.

4. A shock absorber comprising in combination, a casing providing a fluid reservoir; a closed end cylinder attached to and communicating with said reservoir; a piston reciprocal in said cylinder, and having a passage connecting the reservoir with the cylinder on the opposite side of the piston; a tubular member extending from the piston into the cylinder and communicating with the said passage; a check-valve adapted normally to close said passage, said valve however being adapted to open and establish substantially a free flow of fluid from the reservoir to the cylinder in response to the movement of the piston in one direction; a sleeve, providing a valve-seat, secured to the tubular member; a valve in said sleeve, said valve comprising a head portion adapted to rest on the valve-seat and a stem slidably supported in the sleeve, said stem having a contour providing passages between it and the sleeve, which passages terminate below the valve head portion, the valve having a substantially central, longitudinal passage forming a restricted communication between the cylinder and the tubular member; and a spring interposed between the valve and said tubular member.

5. A shock absorber comprising in combination, a casing providing a fluid reservoir; a closed-end cylinder attached to and communicating with said reservoir; a piston reciprocal in said cylinder, and having a passage connecting the reservoir with the cylinder on the opposite side of the piston; a tubular member extending from the piston into the cylinder and communicating with the said passage; a check-valve adapted normally to close said passage, said valve however being adapted to open and establish substantially a free flow of fluid from the reservoir to the cylinder in response to the movement of the piston in one direction; a sleeve, providing a valve-seat, secured to the tubular member; a valve in said sleeve, said valve comprising a head portion adapted to rest on the valve-seat and a stem slidably supported in the sleeve, said stem having a contour providing passages between it and the sleeve, which passages terminate below the valve-head portion, the valve having a substantially central, longitudinal passage forming a restricted communication between the cylinder and the tubular member, a spring interposed between the valve and said tubular member, and a metering pin removably secured to the end of the cylinder and extending coaxially into and through the longitudinal passage in the valve.

6. A shock absorber comprising in combination, a casing providing a fluid reservoir; a closed end cylinder attached to and communicating with said reservoir; a piston reciprocal in said cylinder, and having a passage connecting the reservoir with the cylinder on the opposite side of the piston; a tubular member extending from the piston into the cylinder and communicating with the said passage; a check-valve adapted normally to close said passage, said valve however being adapted to open and establish substantially a free flow of fluid from the reservoir to the cylinder in response to the movement of the piston in one direction; a sleeve, providing a valve-seat, secured to the tubular member; a valve in said sleeve, said valve comprising a head portion adapted to rest on the valve-seat and a stem slidably supported in the sleeve, said stem having a contour providing passages between it and the sleeve, which passages terminate below the valve head portion, the valve having a substantially central, longitudinal passage forming a restricted communication between the cylinder and the tubular member; and a spring interposed between the valve and said tubular member, and a metering pin removably secured to the end of the cylinder and extending coaxially into and through the longitudinal passage in the valve, said pin having a groove which decreases in cross-sectional area as it approaches the free end of the pin.

7. A shock absorber comprising in combination, a casing providing a fluid reservoir; a closed-end cylinder attached to and communicating with the casing; a piston reciprocal in said cylinder, said piston including fluid flow control valves, one of which is provided with a passage substantially coaxial with the cylinder; a metering pin having one end portion extending into and through the said passage, the other end of said pin being provided with a head; and means for removably securing said head-end of the pin to the end of the cylinder, said means including a screw plug insertable into an aperture in the cylinder end, said plug being recessed to receive the head end of the pin, a bushing surrounding the pin and fitting snugly into the recessed plug, the edge of said plug being spun over and against the edge of said bushing whereby the pin is rigidly held in the plug.

8. A shock absorber comprising, in combination, a casing presenting a pressure chamber and a reservoir, a displacement member, and a plunger valve for controlling the flow of fluid from said pressure chamber to the reservoir, said plunger valve having a central orifice adapted to provide for a restricted flow of fluid within a certain range of pressure upon said fluid, said valve, however, being bodily movable to provide for additional fluid passages, for establishing fluid flows parallel to and completely surrounding the initial fluid flow, when said pressure becomes excessive.

9. A shock absorber comprising, in combination, a casing presenting a pressure chamber and a reservoir, a displacement member, means for establishing a free flow of fluid from the reservoir to the pressure chamber in response to the movement of the displacement member in one direction, and means for restricting the flow of fluid from the pressure chamber to the reservoir upon the reverse movement of the displacement member, said means comprising a tubular member providing a valve seat, a valve in said tubular member and having a head portion adapted to engage with the valve seat and a stem slidably supported in the tubular member, said stem having a contour providing passages between it and the tubular member, which passages terminate below the valve head portion, the valve having a central, longitudinal orifice forming a restricted communication between the pressure chamber and the reservoir, a spring within the tubular member adapted to maintain the valve upon the valve seat, and a metering pin extending coaxially into and through the longitudinal passage in the valve.

10. A shock absorber comprising in combination, a casing presenting a pressure chamber and a reservoir, a displacement member, means for establishing a free flow of fluid from the reservoir to the pressure chamber in response to the movement of the displacement member in the one direction, and means for restricting the flow of fluid from the pressure chamber to the reservoir upon the reverse movement of the displacement member, said means comprising a tubular member providing a valve seat, a valve in said tubular member and having a head portion adapted to engage with the valve seat, and a stem slidably supported in the tubular member, said stem having a contour providing passages between it and the tubular member, which passages terminate below the valve head portion, the valve having a central, longitudinal orifice forming a restricted communication between the pressure chamber and the reservoir, a spring within the tubular member adapted to maintain the valve upon the valve seat and a metering pin supported on the casing at its one end, the other end extending into the longitudinal orifice of the valve, said metering pin having a groove decreasing in cross sectional area as it approaches the end of the pin extending into and through the orifice in the valve.

In testimony whereof I hereto affix my signature.

GEORGE W. ELSEY.